(12) United States Patent
Walter et al.

(10) Patent No.: US 11,954,081 B1
(45) Date of Patent: Apr. 9, 2024

(54) MANAGEMENT OF TWO APPLICATION VERSIONS IN ONE DATABASE TABLE

(71) Applicant: SAP SE, Walldorf (DE)

(72) Inventors: Welf Walter, Waghausel (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/960,991

(22) Filed: Oct. 6, 2022

(51) Int. Cl.
*G06F 16/21* (2019.01)
*G06F 8/65* (2018.01)
*G06F 16/22* (2019.01)
*G06F 16/23* (2019.01)

(52) U.S. Cl.
CPC .............. *G06F 16/219* (2019.01); *G06F 8/65* (2013.01); *G06F 16/2282* (2019.01); *G06F 16/2393* (2019.01)

(58) Field of Classification Search
None
See application file for complete search history.

(56) References Cited

U.S. PATENT DOCUMENTS

| | | | | |
|---|---|---|---|---|
| 7,861,253 | B1 * | 12/2010 | Lettington | G06F 9/452 719/311 |
| 10,303,665 | B2 | 5/2019 | Engelko et al. | |
| 10,417,205 | B2 * | 9/2019 | Specht | G06F 11/34 |
| 10,621,167 | B2 | 4/2020 | Auer et al. | |
| 11,340,893 | B2 * | 5/2022 | Trevathan | G06F 8/65 |
| 11,494,179 | B1 * | 11/2022 | Paramasivan | G06F 11/1451 |
| 2010/0235854 | A1 * | 9/2010 | Badgett | G09B 7/06 725/24 |
| 2017/0351442 | A1 * | 12/2017 | Specht | G06F 11/34 |
| 2022/0357941 | A1 * | 11/2022 | Paramasivan | G06F 16/2379 |
| 2022/0392633 | A1 * | 12/2022 | Spicer | G16H 40/67 |
| 2023/0334031 | A1 * | 10/2023 | Acker | G06F 16/219 |

OTHER PUBLICATIONS

"Create Trigger Statement (Data Definition)", SAP HANA SQL Reference Guide for SAP HANA Platform, Generated on Oct. 6, 2022, https://help.sap.com/docs/HANA_SERVICE_CF/7c78579ce9b14a669c1f3295b0d8ca16?locale=en-US&state=PRODUCTION&version=Cloud, (pp. 1-16, 16 total pages).

* cited by examiner

*Primary Examiner* — Kim T Nguyen
(74) *Attorney, Agent, or Firm* — Buckley, Maschoff & Talwalkar LLC

(57) ABSTRACT

Systems and methods include configuration of a first database view to read from common versions of rows of a database table or from rows of the database table associated with a first version of the application, the database table storing application content, configuration of a first application server to write to the common versions of rows of the database table, configuration of a second database view to read from common versions of rows of the database table or from rows of the database table associated with a second version of the application, configuration of a second application server to write to rows of the database table associated with the second version of the application, modification of the database table to include rows associated with the second version of the application while the first application server executes the first version of the application and incoming user requests are directed to the first application server, configuration of the second application server to write to common versions of the rows of the database table, and re-direction of incoming user requests to the second application server executing the second version of the application.

20 Claims, 9 Drawing Sheets

MANAGEMENT OF TWO APPLICATION VERSIONS IN ONE DATABASE TABLE

BACKGROUND

Conventional enterprises utilize many software applications to facilitate their operations. New versions of these applications are developed from time-to-time, which may include new features, optimizations and/or bug fixes. Various techniques have been employed to update an application to a newer version thereof.

To perform updates, conventional procedures deploy new or updated application content of a new application version to the database used by the application. Such content may include a new default configuration, new code, role definitions, user interface (UI) definitions, text, etc. Once the application content is deployed in full, users are switched to use the new application version. The deployment of new or updated application content typically requires many changes to the database structure and modification of the content of several tables. Accordingly, the deployment of new or updated application content cannot be completed in one database transaction. Rather, such operations may require several hours to complete.

Conventionally, such updates were performed during a downtime period in which the application to be updated is taken offline and is therefore unavailable to users. However, modern applications are typically offered as a Software-as-a-Service (SaaS) solution and simultaneously consumed by a number of different organizations. It is therefore desirable to perform updates while imposing minimal (or zero) application downtime on users.

Recent techniques are able to update an application to a new version while the application is running (i.e., serving incoming user requests). These techniques create clones of the tables which are changed by the update and deploy the application content to the cloned tables. Once all the application content is deployed, incoming user requests are switched to the updated application, which accesses the now-updated cloned tables.

The time required to clone the affected tables may be unsuitable. For a Continuous Improvement/Continuous Development (CI/CD) approach, longer deployment durations may hinder the goal of deploying a new application version several times per day. Not only is the deployment frequency limited due to the duration of deployment when using table cloning, but other changes are also potentially blocked during this duration such as customer creation of application extensions.

Moreover, cloning the affected tables requires additional memory and resources. Generally, a cloned table doubles the amount of memory (e.g., Random Access Memory (RAM), disk) required for the table, and may require even more memory if a high-availability mirror storage system is implemented. Cloning also requires the reading and writing of large amounts of data. Since it is desirable to not degrade performance of the application during deployment, additional hardware resources are required during deployment. These additional hardware resources may be added temporarily or provided long-term as a buffer, but either approach imposes additional costs. In the case of an SaaS solution, low operational cost is of key importance.

Systems are desired for updating an application version while providing low or no downtime and avoiding database table cloning.

DETAILED DESCRIPTION

The following description is provided to enable any person in the art to make and use the described embodiments. Various modifications, however, will remain readily-apparent to those in the art.

Some embodiments provide a system to maintain two versions of application content within a single database table during deployment of an update. Since a deployment typically updates only a subset of the records in a database tables, such an approach may complete the deployment more quickly than other approaches in which full tables are cloned. This approach is substantially transparent to consumers of the table.

More specifically, each table which stores application content (or each table to be updated) is enhanced by an additional key-column (e.g., "Vers", with the two underscores indicating a generated field as opposed to a developer-defined field). This key-column is not exposed to the consumers of the table. Rather, a view is created which selects a specific set of rows filtered on the key-column and consumers read from this view. During the deployment of updated application content, another view is created for the deployment of the change with a different selection of rows filtered on a different value of the key-column.

Figures 1, 2:
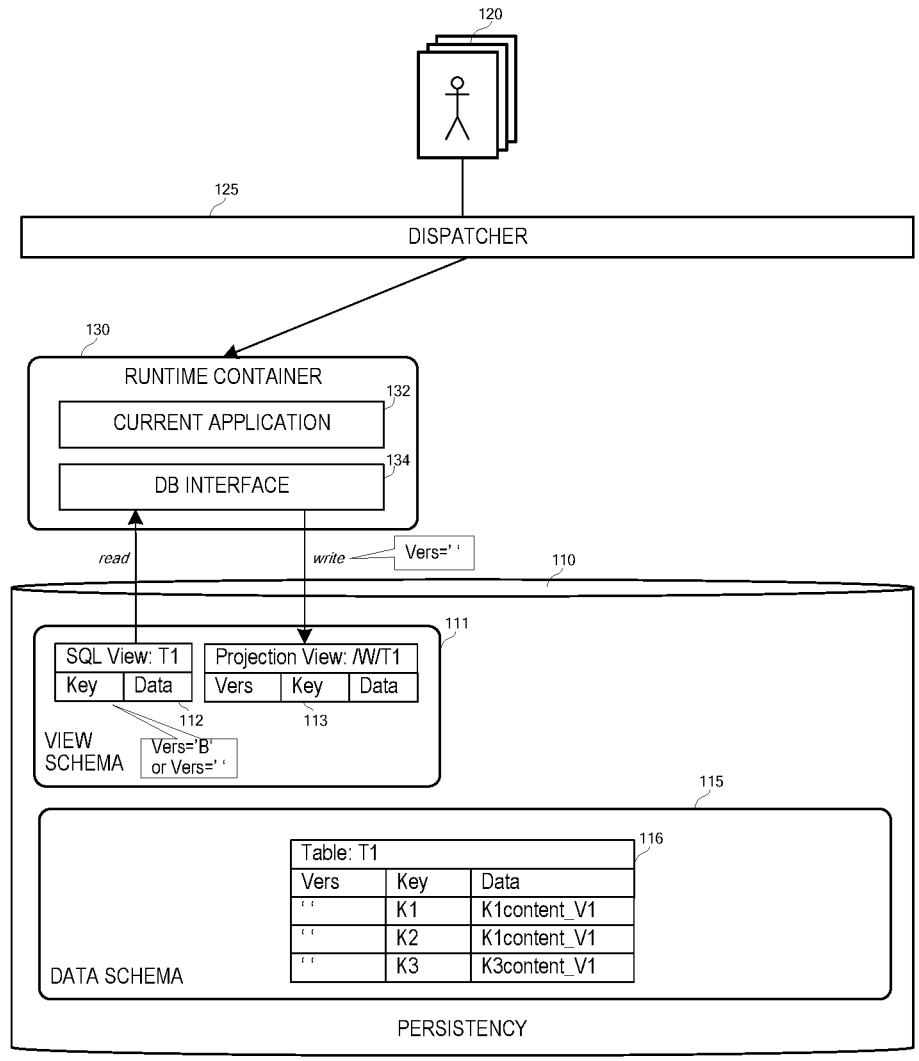
FIG. 1 illustrates operation of a first version of an application prior to deployment of new and updated application content according to some embodiments.
FIG. 2 is a tabular representation of new and updated application content of a second application version according to some embodiments.

FIG. 1 illustrates operation of a first version of an application prior to deployment of new and updated application content according to some embodiments. The illustrated components may be implemented using any suitable combinations of computing hardware and/or software that are or becomes known. Such combinations may include cloud-based implementations in which computing resources are virtualized and allocated elastically. In some embodiments, two or more components are implemented by a single computing device.

Persistency 110 may comprise a database system as is known in the art. Persistency 110 may comprise a single node or distributed database system, and may be implemented using hardware such as but not limited to an on-premise computer server or a cloud-based virtual machine. Persistency 110 may be managed by program code of a query-responsive database management system (DMBS). According to some embodiments, persistency 110 is an "in-memory" database, in which all data is loaded into memory upon startup and requested changes are made thereto. The changed data is flushed from time-to-time to move older data versions from memory to persistent storage or to persist a database snapshot.

Persistency 110 stores database tables within data schema 115 and views on the database tables within view schema 111. View schema 111 may also store program code of database procedures and other artifacts as in known in the art. The database tables of data schema 115 conform to a logical data model as is known in the art.

The logical data model may be specified by a developer of an application which is intended to access the database tables. Table T1 116 of data schema 115 stores application content of a first version of an application, i.e., current application 132. The application content may include configurations, code, role definitions, UI definitions, text, etc. Data schema 115 includes other unshown tables storing application content of current application 132.

Table T1 116 includes two columns Key and Data defined by an application developer. According to some embodiments, column Vers is generated (e.g., by an administrator) in order to prepare Table T1 116 for an update as described herein. The value of column Vers for each row is initially set to ' ' (i.e., blank). In the present description, Vers=' ' denotes "common" version rows, Vers='B' denotes "current" or "first" version rows, and Vers='G' denotes "updated" or "second" version rows. Embodiments are not limited to these values, as any three different values may be used. A column Vers may similarly be added to all other tables of schema 115 which store application content. Usage of the column Vers before, during and after an update will be described below.

Current application 132 comprises processor-executable program code executed within runtime container 130. Runtime container 130 and its execution environment may be provided by a server as is known in the art. The server may comprise, for example, a web server, an application server, a proxy server, a network server, and/or a server pool. Such a server accepts requests for application services and provides such services to any number of client devices.

Runtime container 130 and persistency 110 may comprise a production system which is deployed by an enterprise to service incoming user requests. During operation, users 120 request functionality, dispatcher 125 directs corresponding requests to runtime container 130, and current application 132 issues corresponding queries to database interface 134. The queries may include read statements or write statements.

For read statements directed to table T1 116, database interface 134 reads from view T1 112 of view schema 111. View T1 112 is not a standard projection of table T1 116, but rather selects only from rows in which Vers=' ' or 'B'. If no rows with these values are found, the requested entry is considered to not exist. Moreover, since the system described herein guarantees that, for a given key, only one record exists in which Vers=' ' or 'B', view T1 112 returns a maximum of one row per key.

Database interface 134 is enhanced to identify write operations (i.e., insert, update, delete) and re-direct these queries to projection view /W/T1 113. During productive use as illustrated in FIG. 1, database interface 134 sets Vers=' ' for the re-directed queries.

FIG. 2 is a tabular representation of new and updated application content of a second application version according to some embodiments. Table T1 200 includes application content for the keys of an updated version of current application 132. As shown, the updated version includes updated content for key K1 of table T1, the same content for key K2, no content for K3 (i.e., key K3 is not used), and new content for key K4 (since key K4 is not used in table T1 116). As described above, a second application version may require new and updated application content in several different tables of schema 115.

Figure 3:
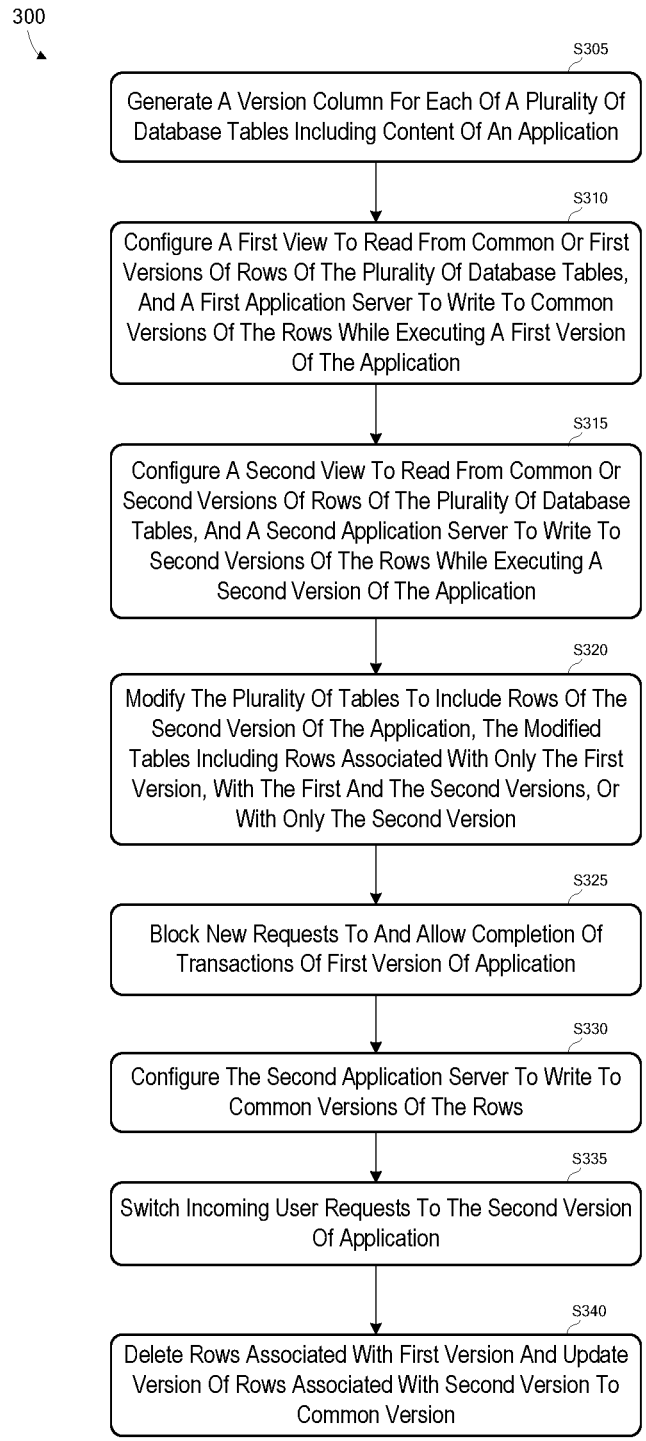
FIG. 3 is a flow diagram of a process to update a first version of an application to a second version of the application according to some embodiments.

FIG. 3 illustrates process 300 to update a first version of an application to a second version of the application according to some embodiments. Process 300 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, at S305, a plurality of database tables including application content of an application are modified. The modification includes generation of a version key-column for each of the plurality of tables. The plurality of database tables may include all database tables of an application-specific data schema which include application content, or a subset thereof. In some embodiments, an application developer may define the application-specific schema to include such a version key-column in each table which includes application content, in which case S305 may be omitted.

A first view is configured to read from common or first versions of rows of the plurality of database tables at S310. View T1 112 of view schema 111 may comprise a view configured at S310. In some embodiments, the first view is configured using the statement CREATE view BLUE.T1 as select <field-list, w/o VERS> from DATA.T1 WHERE VERS="B" or VERS=" ".

Also at S310, a first application server is configured to write to common versions of the rows of the database tables while executing a first version of the application. S310 includes creation of a projection view in the view schema to receive write statements from the first application server. For example, such a projection view may be created using: CREATE projection view BLUE./W/T1 as select <field-list> from DATA.T1. A database interface of the first application server which receives queries from the first version of the application, is enhanced at S310 to identify write operations and re-direct these queries to the created projection view.

The first application server then executes the first version of the application to receive incoming user requests. Execution of the first version of the application to receive the user requests results in transmission of read statements and write statements from the first version of the application to the database interface. For read operations, the database interface reads from the first view (e.g., view BLUE.T1). The database interface identifies write operations and re-directs these operations to the projection view (i.e., view BLUE./W/T1) with VERS field=' '.

Figure 4:
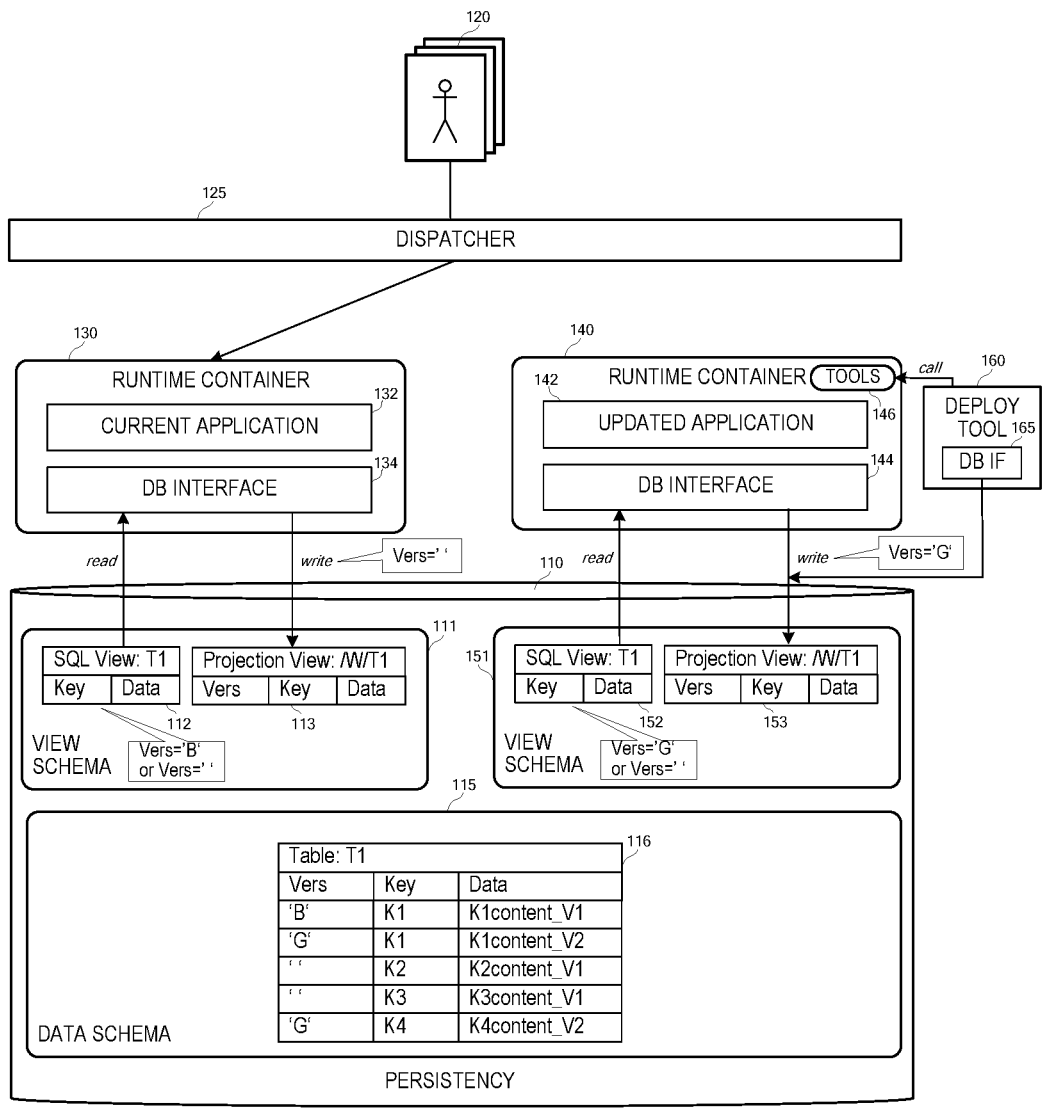
FIG. 4 illustrates deployment of new and updated application content of a second application version while a first application version is serving incoming user requests according to some embodiments.

At some point during operation, it may be determined to update the application. Accordingly, at S315, a second view is configured to read from common or second versions of rows of the plurality of database tables. FIG. 4 illustrates view schema 151 including view T1 152 configured at S310 according to some embodiments. View T1 151 may be configured using the statement CREATE view GREEN.T1 as select <field-list, w/o VERS> from DATA.T1 WHERE VERS="G" or VERS=" ", where VERS="G" denotes second versions of the rows.

Also at S315, a second application server is configured to write to second versions of the rows of the database tables while executing a second version of the application. This configuration includes creation of a projection view in the view schema to receive write statements from the second application server, and configuration of a database interface of the second application server to identify write operations received from the second version of the application and re-direct these queries to the created projection view. For example, projection view 153 of view schema 151 may be created at S315 using: CREATE projection view GREEN./W/T1 as select <field-list> from DATA.T1, and database interface 144 may identify write operations received from updated application 142 and re-direct these operations to projection view /W/T1 153 with VERS field='G'.

Advantageously, S315 may be executed while the first version of the application is executing as described above to serve incoming user requests. Similarly, below-described S320 is also executed while the first version of the application continues to serve incoming user requests.

The plurality of tables including application content are modified at S320 to include rows of the second version of the application. The thusly-modified tables may thereafter include rows associated with only the first version of the application, with the first and the second versions, or with only the second version. Table T1 116 of FIG. 4 illustrates such a modification, in which the first and fourth rows are associated with only the first version of the application, the third row is associated with the first and the second versions, and the second and fifth rows are associated with only the second version of the application.

According to some embodiments, deploy tool 160 modifies the tables at S320. Deploy tool 160 may be provided with a list of rows including application content of the second version which are to be added to the tables (i.e., having keys which do not exist in the tables) and rows including application content of the second version which are to be updated (i.e., having keys which are identical to existing keys of the tables). Deploy tool 160 modifies table 116 by writing to database interface 165. Database interface 165 may direct the write operations to projection view /W/T1 153 with VERS='G' as described above with respect to database interface 144. In some embodiments, deploy tool 160 may be executed by runtime container 140 and write to database interface 144 to achieve the same result.

Figure 5:
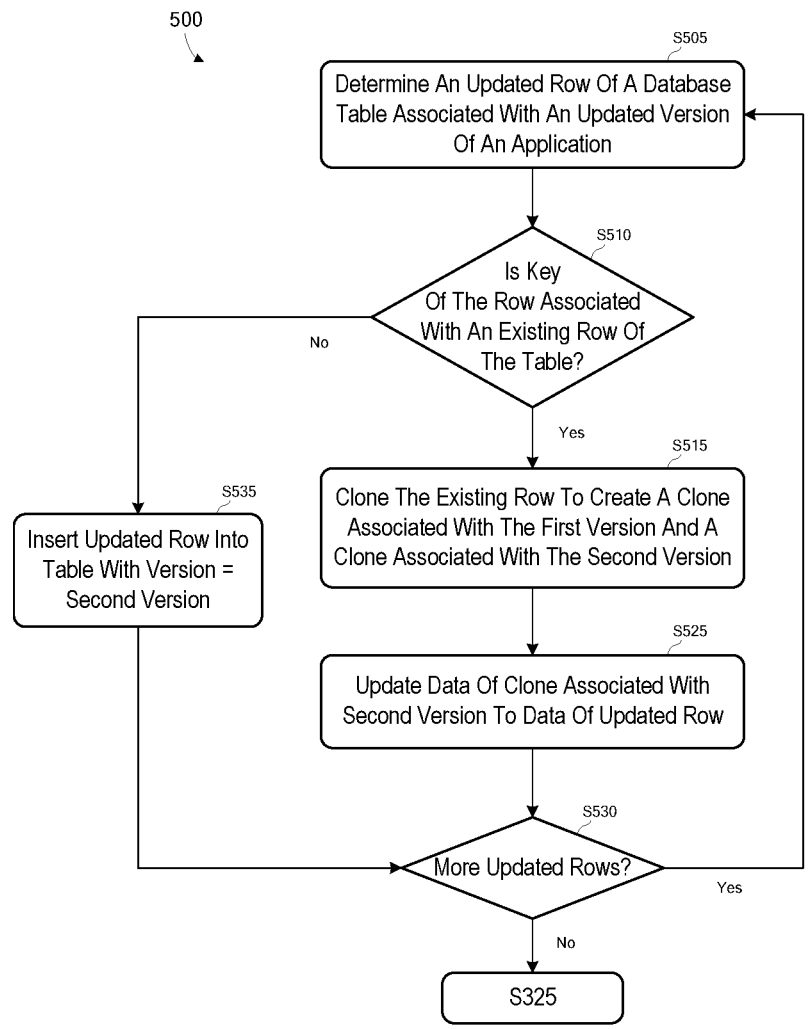
FIG. 5 is a flow diagram of a process to update application content of a database table while a first application version is serving incoming user requests according to some embodiments.
Figure 6:
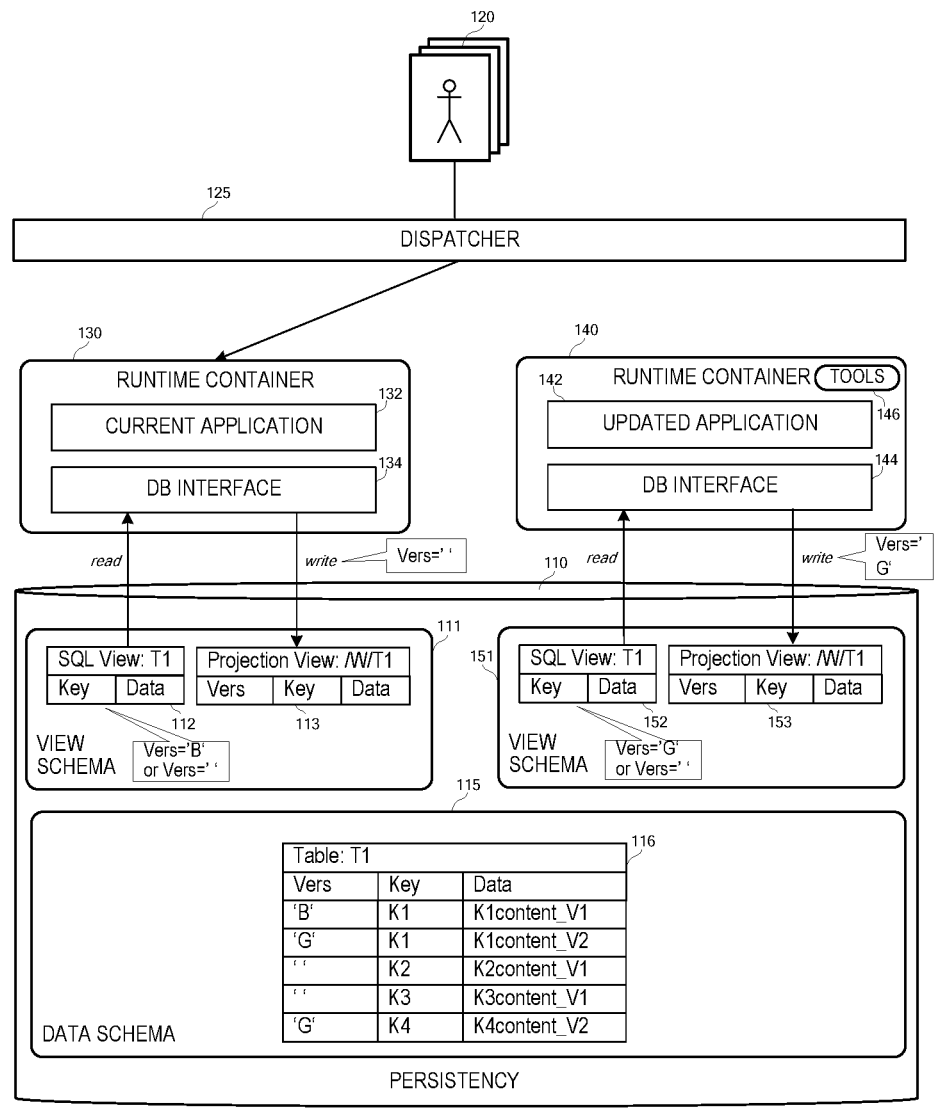
FIG. 6 illustrates serving incoming user requests to a first application version after deployment of new and updated application content of a second application version according to some embodiments.

FIG. 5 illustrates process 500 to modify application content of a database table at S320 while a first application version is serving incoming user requests according to some embodiments. At S505, an updated row of a database table associated with an updated version of an application is determined. The updated row may be determined from a list of rows including application content of the updated version which are to be added to the table and rows including application content of the updated version which are to be updated. In some embodiments, the list of rows includes all rows of the table which are associated with the updated version, and S505 includes steps to ignore rows of the updated version of the application which are identical (i.e., same key and content) in the current version of the application.

At S510, it is determined if the key of the determined row is associated with an existing row of the table. For purposes of example, it will be assumed that the row determined at S505 is the first row of table 200 of FIG. 2. Key K1 of the first row is determined at S510 to be associated with an existing row (i.e., the first row) of table T1 116. Flow therefore proceeds to S515 to clone the existing row within the table to create a clone associated with the first version of the application and a clone associated with the second version of the application.

In one example of S515, the existing row may be read with VERS=' ' and inserted with VERS='B', and is then read again with VERS=' ' and inserted with VERS='G'. Next, the existing record with VERS=' ' is deleted. Alternatively, the existing row is read with VERS=' ' and inserted with VERS='B', and then the existing row is updated from VERS=' ' to VERS='G'.

S515 is to be performed in a single database transaction. According to some embodiments, DB interface 144 performs this transaction. In other embodiments, a database "before" trigger is activated in projection view 153 during deployment of application content updates. Such a database trigger causes S510 and S515 to be executed automatically in response to receipt of an update operation from DB interface 144, with the requested update operation occurring at S525.

Accordingly, at S525, the data of the clone associated with the second version is updated to reflect the data of the updated row which was determined at S505. FIG. 4 shows the resulting rows of table T1 116, which are both associated with key K1. The value of the Vers column of the first row is 'B', the value of the Vers column of the second row is 'G', the content of the second row is the content of the first row of table 200.

It is noted that subsequent updates to the same row (i.e., the same key) will not cause cloning of an existing row. For example, no record including the key and VERS=' ' will exist at such a subsequent update so no record will be returned from the above-described read operation.

At S530, it is determined whether other updated rows of the database table exist. If so, flow returns to S505. It will be assumed that a next-determined row is the third row of table 200 of FIG. 2. As described above, the second row of table 200 is not determined at S505 because it is identical to a row of table T1 116. That is, the second row is either not included in a list of updated rows acquired by deploy tool 160 or deploy tool 160 determines that no update is required based on the second row.

It is determined at S510 that key of the determined row (i.e., K4) is not associated with an existing row of table T1 116. Accordingly, the determined row is inserted into table T1 116 at S535 with the value of its Vers column='G'. For example, deploy tool 160 modifies table 116 at S535 by writing to database interface 165, which directs the write operations to projection view /W/T1 153 with VERS='G' as described above. FIG. 4 illustrates thusly-modified table T1 116 according to this example.

Continuing the present example, it is then determined at S530 that no more updated rows exist and flow continues to S325 of process 300.

The first application server may continue to issue read and write operations as described above during modification of the table at S320. As mentioned above, the first application server reads rows with VERS=' ' or 'B', and writes rows with VERS=' '. Therefore, the application server continues to be able to update a row with VERS=' '. However, if the row is now associated with VERS='B' by virtue of the above-described process, is no VERS=' ' of the row exists and such a write statement will fail. An error message may be generated indicating this specific operation cannot be executed during the upgrade but can be re-tried after the switch to the updated version of the application.

In a case that the first application server attempts an insert operation of a row with a given key and VERS=' ', the projection view (e.g., projection view 113) may check for the existence of a row associated with the same key and with VERS='B' and/or VERS='G'. If such a row exists, the operation is not performed and an error message as described above may be generated. This check, for example, would prevent the first application server from inserting a record with key K4 after deploy tool 160 has inserted a row with key K4 (and VERS='G'). Consequently, the second application server would therefore not receive two results (i.e., one with VERS='G' and one with VERS=' ') upon selecting key K4 via view 152.

Also during deployment of updated application content at S320, deploy tool 160 may call tools 146 to operate as is known in the art to update application content which is dependent on system state. Such content may include a runtime object computed by tools 146 based on a new interface. Tools 146 may use interface 144 to write such content to appropriate tables during S320, and a "before" database trigger of projection view 153 may handle such writes as described above.

Figure 7:
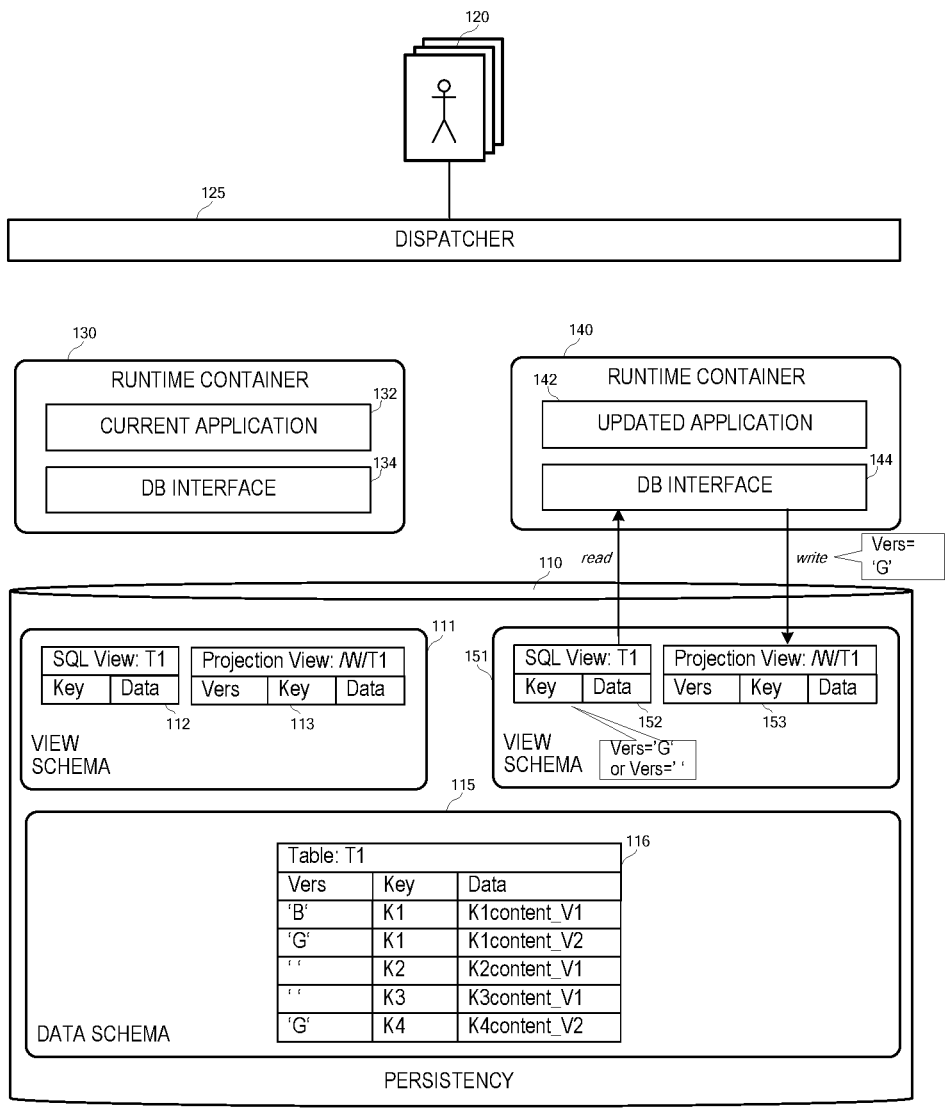
FIG. 7 illustrates a period of blocked incoming user requests to a first application version according to some embodiments.

Once S320 is complete, new requests to the first version of the application are blocked and transactions currently executing on the first application server are allowed a short period of time to complete at S325. A few seconds should allow a vast majority of such transactions to complete, and longer running transactions are terminated after the designated time period. FIG. 7 illustrates a system at S325, during which no requests are incoming to either of runtime containers 130 or 140.

Figure 8:
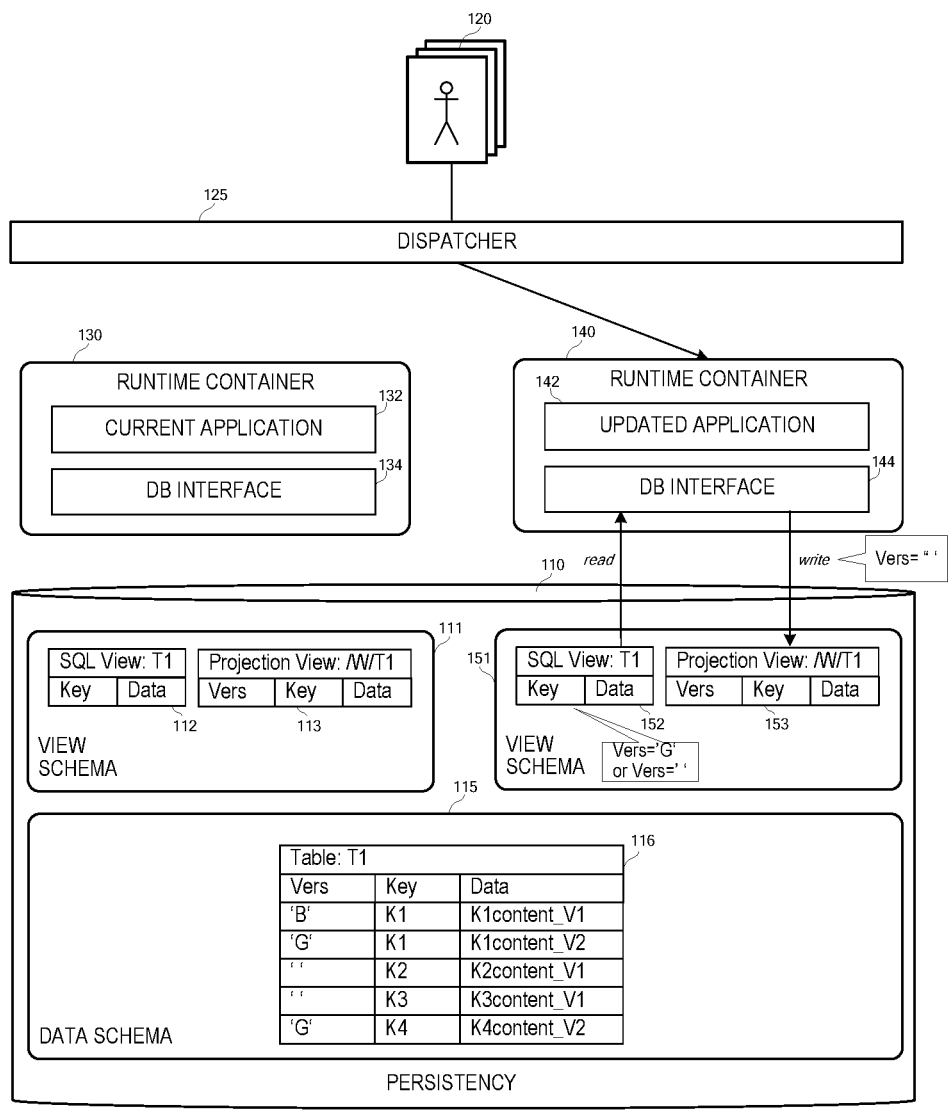
FIG. 8 illustrates execution of a second application version after switching incoming user requests to the second application version according to some embodiments.

Next, at S330, the second application server is configured to write rows associated with VERS=" ". This configuration change is made to database interface 144 in the present example. Incoming user requests are then switched to the second version of the application at S335. FIG. 8 illustrates a system after S335, in which dispatcher 125 now routes incoming user requests to runtime container 140. Also as shown, database interface 144 writes rows to projection view 153 with VERS=' '.

While the second version of the application is serving user requests, rows of the tables associated with the first version of the application are deleted at S340. Also, rows associated with the second version of the application are updated to the common version. According to some embodiments of S340, the following two statements are executed in one database transaction to avoid duplicate records being provided to view 152: DELETE . . . WHERE VERS='B'; and UPDATE . . . SET VERS=' 'WHERE VERS='G'. Application 142 may continue to serve incoming user requests during S340. Accordingly, S340 may be executed at low priority so as to not disrupt system performance.

Figure 9:
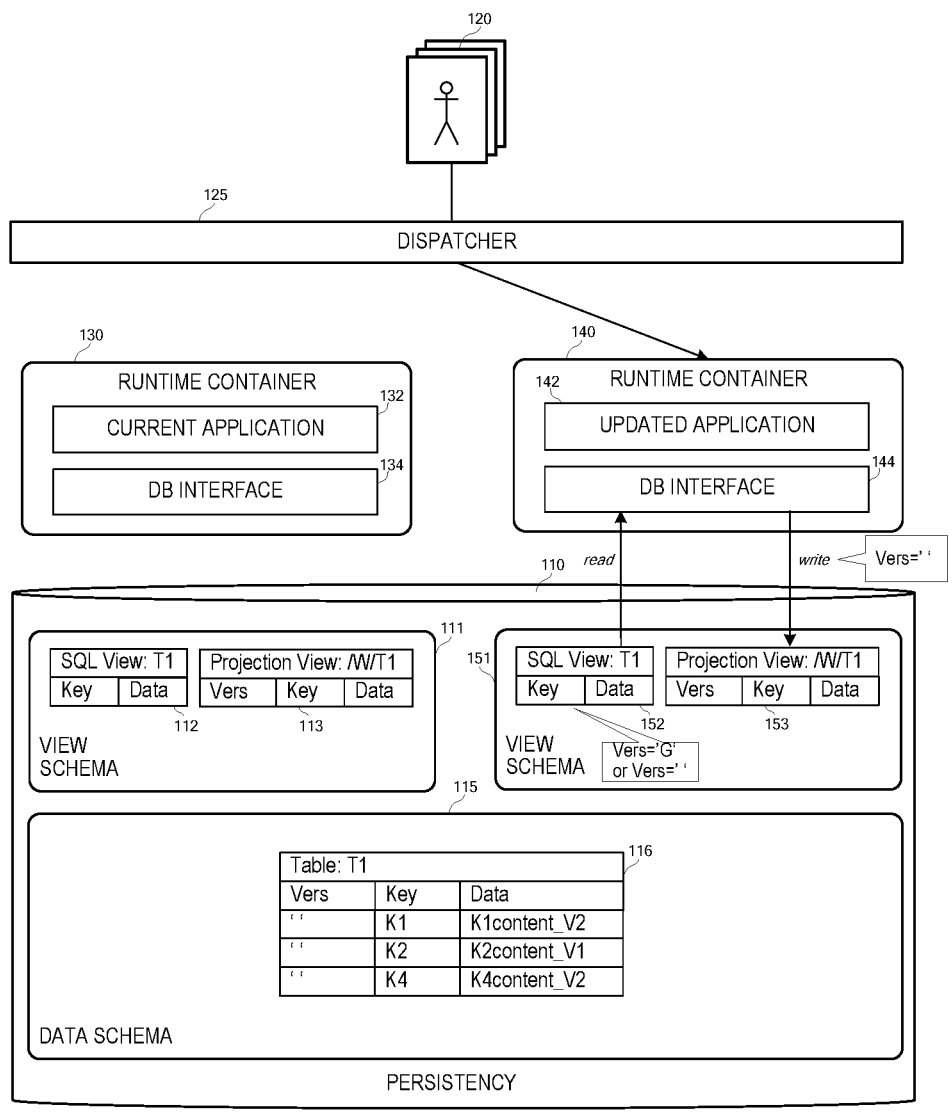
FIG. 9 illustrates execution of a second application version after switching incoming user requests to the second application version and removing application content specific to a first application version according to some embodiments.

FIG. 9 illustrates table T1 116, in which rows associated with VERS='B' have been deleted and rows associated with VERS='G' (i.e., the first and third rows) are now associated with VERS=' '. Advantageously, since the system now contains only records associated with VERS=' ', the above-described process may be repeated to perform a next update, with VERS='G' representing the current application and VERS='B' representing the updated application.

It is noted that a collision may occur if an update requires a range delete but there is no corresponding record in the table. To address this situation, an additional table ALLOWEDKEYS may be employed with entries for each table which uses the VERS-based updating mechanism described herein. The ALLOWEDKEYS table includes a field WHERECLAUSE which specifies what keys can be written to in each table. In alternative embodiments, a table REJECTEDKEYS is defined which also includes entries for every table using the VERS-based mechanism and including a field WHERECLAUSE, which in this alternative case specifies keys which cannot be written to in each table.

Upon receiving a write operation, a database interface re-directs the write to the table /W/T1 only after verifying that the modified keys match the WHERECLAUSE defined in ALLOWEDKEYS (or do not match the WHERECLAUSE defined in REJECTEDKEYS). The field WHERECLAUSE in REJECTEDKEYS may be populated by deploy tool 160 in the case of range deletes. For example, if deploy tool 160 is to delete all records with "NAME like "'A %'", the where clause is added to the operation and the database interface checks the keys of entries to be written against "'A %'". This check may alternatively be performed by a "before" trigger of table /W/T1.

Figure 10:
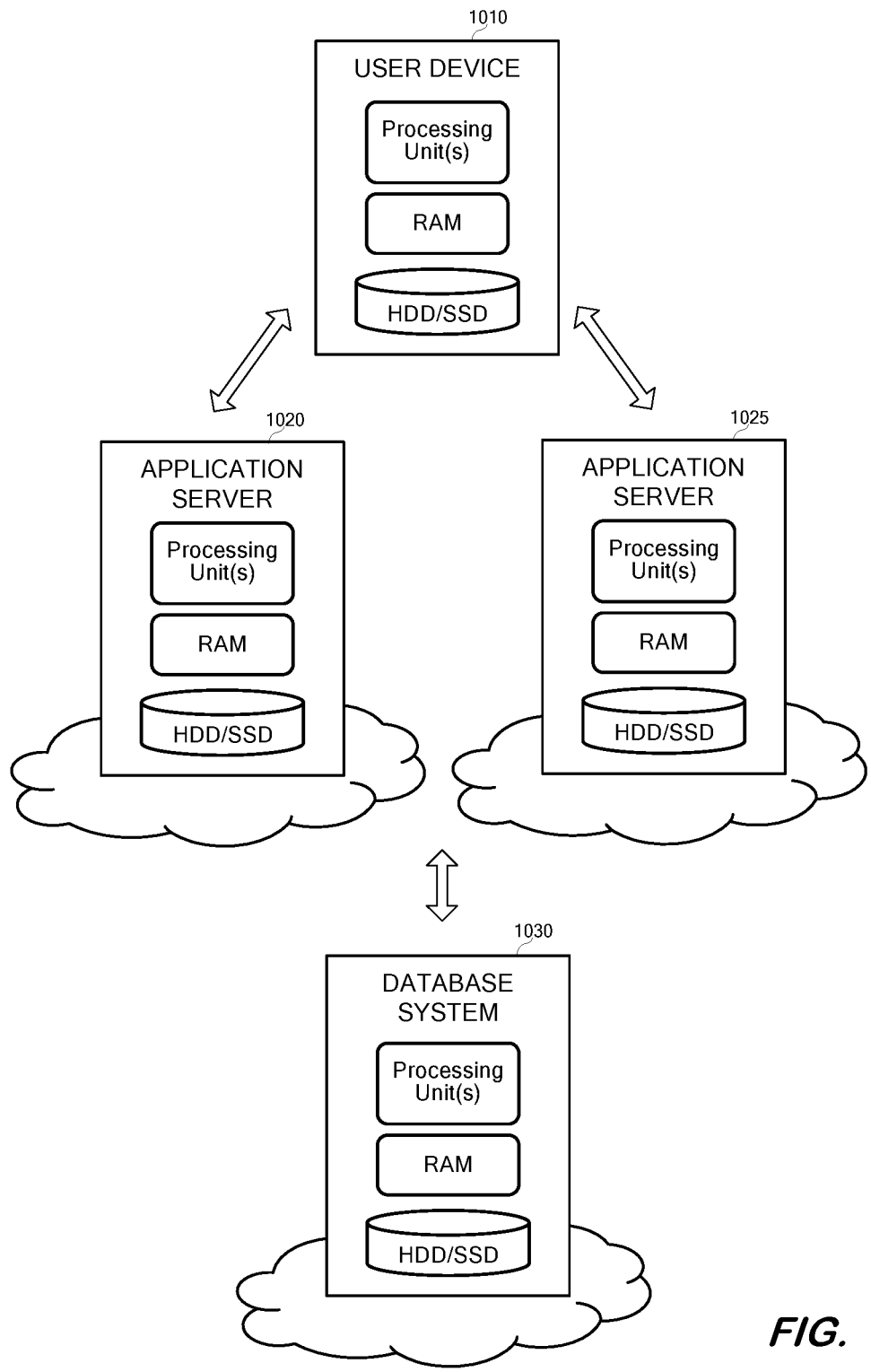
FIG. 10 is a block diagram of cloud-based servers of a system to update a first version of an application to a second version of the application according to some embodiments.

FIG. 10 illustrates a cloud-based database deployment according to some embodiments. The illustrated components may comprise cloud-based compute resources residing in one or more public clouds providing self-service and immediate provisioning, autoscaling, security, compliance and identity management features.

User device 1010 may interact with a first version of an application executing on application server 1020, for example via a Web Browser executing on user device 1010, in order to create, read, update and delete data managed by database system 1030. Application content of the first version of the application is stored by database system 1030 as described herein.

The application content may be updated within database system 1030 as also described herein based on a second version of the application executing on application server 1025. Once the application content is updated, incoming requests from user device 1010 may be routed to the second version of the application executing on application server 1025 in order to create, read, update and delete data managed by database system 1030.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
    a memory storing processor-executable program code; and
    at least one processing unit to execute the processor-executable program code to cause the system to:
    configure a first database view to read from common versions of rows of a database table or from rows of the database table associated with a first version of the application, the database table storing application content;
    configure a first application server to write to the common versions of rows of the database table;
    configure a second database view to read from common versions of rows of the database table or from rows of the database table associated with a second version of the application;
    configure a second application server to write to rows of the database table associated with the second version of the application;
    modify the database table to include rows associated with the second version of the application while the first application server executes the first version of the application and incoming user requests are directed to the first application server;
    configure the second application server to write to common versions of the rows of the database table; and
    re-direct incoming user requests to the second application server executing the second version of the application.

2. A system according to claim 1, wherein modification of the database table comprises:
    reading a common version of a row associated with a key from the database table;
    inserting a first copy of the row into the database table, the first copy associated with the first version of the application;
    inserting a second copy of the row into the database table, the second copy associated with the second version of the application;
    deleting the common version of the row; and
    updating the second copy of the row to include application content associated with the second version of the application.

3. A system according to claim 2, wherein inserting the first copy, inserting the second copy and deleting the common version of the row are performed by a before trigger in a same database transaction.

4. A system according to claim 1, wherein modification of the database table comprises:
    reading a common version of a row associated with a key from the database table;
    inserting a first copy of the row into the database table, the first copy associated with the first version of the application; and
    updating the common version of the row to include application content associated with the second version of the application and to associate the row with the second version of the application.

5. A system according to claim 4, wherein inserting the first copy and updating the common version of the row are performed by a before trigger in a same database transaction.

6. A system according to claim 1, the at least one processing unit to execute the processor-executable program code to cause the system to:
    delete rows of the database table associated with the first version of the application; and
    update rows of the database table associated with the second version of the application to common versions.

7. A system according to claim 6, the at least one processing unit to execute the processor-executable program code to cause the system to:
    configure the first application server to write to rows of the database table associated with a third version of the application;
    modify the database table to include rows associated with the third version of the application while the second application server executes the second version of the application and incoming user requests are directed to the second application server;
    configure the first application server to write to common versions of the rows of the database table; and
    re-direct incoming user requests to the first application server executing the third version of the application.

8. A computer-implemented method comprising:
    configuring a first database view to read from common versions of rows of a database table or from rows of the database table associated with a first version of the application, the database table storing application content;
    configuring a first application server read from the first database view and to write to the common versions of rows of the database table using a first projection view on the database table;
    configuring a second database view to read from common versions of rows of the database table or from rows of the database table associated with a second version of the application;
    configuring a second application server to read from the second database view and to write to rows of the database table associated with the second version of the application using a second projection view on the database table;
    modifying the database table to include rows associated with the second version of the application while the first application server executes the first version of the application and incoming user requests are directed to the first application server;
    configuring the second application server to write to common versions of the rows of the database table; and
    re-directing incoming user requests to the second application server executing the second version of the application.

9. A method according to claim 8, wherein modifying the database table comprises:
    reading a common version of a row associated with a key from the database table;

inserting a first copy of the row into the database table, the first copy associated with the first version of the application;

inserting a second copy of the row into the database table, the second copy associated with the second version of the application;

deleting the common version of the row; and updating the second copy of the row to include application content associated with the second version of the application.

10. A method according to claim 9, wherein inserting the first copy, inserting the second copy and deleting the common version of the row are performed by a before trigger of the second projection view in a same database transaction.

11. A method according to claim 8, wherein modifying the database table comprises:

reading a common version of a row associated with a key from the database table;

inserting a first copy of the row into the database table, the first copy associated with the first version of the application; and updating the common version of the row to include application content associated with the second version of the application and to associate the row with the second version of the application.

12. A method according to claim 11, wherein inserting the first copy and updating the common version of the row are performed by a before trigger of the second projection view in a same database transaction.

13. A method according to claim 8, further comprising:

deleting rows of the database table associated with the first version of the application; and updating rows of the database table associated with the second version of the application to common versions.

14. A method according to claim 13, further comprising:

configuring the first application server to write to rows of the database table associated with a third version of the application using the first projection view;

modifying the database table to include rows associated with the third version of the application while the second application server executes the second version of the application and incoming user requests are directed to the second application server;

configuring the first application server to write to common versions of the rows of the database table using the first projection view; and re-directing incoming user requests to the first application server executing the third version of the application.

15. A non-transitory computer-readable medium storing processor-executable program code, the program code executable by a computing system to:

configure a first database view to read from common versions of rows of a database table or from rows of the database table associated with a first version of the application, the database table storing application content;

configure a first application server to write to the common versions of rows of the database table;

configure a second database view to read from common versions of rows of the database table or from rows of the database table associated with a second version of the application;

configure a second application server to write to rows of the database table associated with the second version of the application;

modify the database table to include rows associated with the second version of the application while the first application server executes the first version of the application and incoming user requests are directed to the first application server;

configure the second application server to write to common versions of the rows of the database table; and re-direct incoming user requests to the second application server executing the second version of the application.

16. A non-transitory medium according to claim 15, wherein modification of the database table comprises:

reading a common version of a row associated with a key from the database table;

inserting a first copy of the row into the database table, the first copy associated with the first version of the application;

inserting a second copy of the row into the database table, the second copy associated with the second version of the application;

deleting the common version of the row; and updating the second copy of the row to include application content associated with the second version of the application.

17. A non-transitory medium according to claim 16, wherein inserting the first copy, inserting the second copy and deleting the common version of the row are performed by a before trigger in a same database transaction.

18. A non-transitory medium according to claim 15, wherein modification of the database table comprises:

reading a common version of a row associated with a key from the database table;

inserting a first copy of the row into the database table, the first copy associated with the first version of the application; and updating the common version of the row to include application content associated with the second version of the application and to associate the row with the second version of the application.

19. A non-transitory medium according to claim 18, wherein inserting the first copy and updating the common version of the row are performed by a before trigger in a same database transaction.

20. A non-transitory medium according to claim 15, the program code executable by a computing system to:

delete rows of the database table associated with the first version of the application;

update rows of the database table associated with the second version of the application to common versions;

configure the first application server to write to rows of the database table associated with a third version of the application;

modify the database table to include rows associated with the third version of the application while the second application server executes the second version of the application and incoming user requests are directed to the second application server;

configure the first application server to write to common versions of the rows of the database table; and re-direct incoming user requests to the first application server executing the third version of the application.

* * * * *